United States Patent [19]

Nichols, III

[11] 4,119,955

[45] Oct. 10, 1978

[54] CIRCUIT FOR DISPLAY, SUCH AS VIDEO GAME DISPLAY

[75] Inventor: Andrew J. Nichols, III, Palo Alto, Calif.

[73] Assignee: Intel Corporation, Santa Clara, Calif.

[21] Appl. No.: 780,967

[22] Filed: Mar. 24, 1977

[51] Int. Cl.² .............................................. G06F 3/14
[52] U.S. Cl. .............................. 340/324 AD; 178/15; 273/85 G
[58] Field of Search ................... 340/324 AD, 324 A; 178/15, 30; 273/85 G

[56] References Cited

U.S. PATENT DOCUMENTS

| Re. 28,507 | 8/1975 | Rusch | 340/324 AD |
|---|---|---|---|
| 3,781,850 | 12/1973 | Gicca et al. | 340/324 AD |
| 3,836,902 | 9/1974 | Okuda et al. | 340/324 AD |
| 3,849,773 | 11/1974 | Katahira et al. | 340/324 AD |

*Primary Examiner*—Marshall M. Curtis
*Attorney, Agent, or Firm*—Blakely, Sokoloff, Taylor & Zafman

[57] ABSTRACT

A digital display circuit for use with a video game or other displays fabricated as an MOS integrated circuit is described. The circuit permits the simultaneous display of many different patterns (and the simultaneous display of the same pattern) at any locations on a raster scanned cathode ray tube. Content-addressable memories are employed to compare the contents of a digital beam location counter with desired object locations. A random-access memory is then used to address a pattern library where each line of the patterns is stored. When more than one pattern is displayed at the same location, counting in the digital beam location counter is delayed to permit accessing of more than a single pattern line from the pattern library. A displacement counter is employed to store a count representative of the displacement between the actual beam position and the contents of the beam counter. The beam location counter is incremented at a faster rate during non-display periods to compensate for delayed counting. The circuit provides an easy method for detecting the coincidence of patterns and the coincidence of patterns with a grid.

15 Claims, 7 Drawing Figures

Fig. 1

Fig. 2 LOCATION SUBSYSTEM

Fig. 3 PATTERN SUBSYSTEM

Fig. 4

Fig. 5 SHIFT REGISTER & LATCH

Fig. 6 SHIFT REGISTER AND LATCH

Fig. 7

CIRCUIT FOR DISPLAY, SUCH AS VIDEO GAME DISPLAY

BACKGROUND OF THE INVENTION

1. Field of the Invention

The invention relates to digital storage and display means for generating video signals.

2. Prior Art

The recent proliferation of video games no doubt has been stimulated by the availability of low-cost microprocessors. In many cases, these games operate in conjunction with home television receivers, thus the consumer need not purchase a separate display. For a general discussion of video games, see the article entitled "Games," *Electronics*, June 24, 1976 edition, beginning at page 89.

The standard raster scan employed by television receivers presents unique and difficult problems for displaying the digital information provided by game-programmed microprocessors or the special game "chips." Pattern storage, display of overlapping patterns, the detection of coincidence between patterns, in addition to other tasks, requires unique circuitry to interface the processor's digital information with the raster scan and beam control of a television receiver.

U.S. Pat. 3,345,458; 3,388,391; 3,422,420 and 3,426,344 describe several prior art systems for providing video signals from digital storage, particularly for the display of messages.

SUMMARY OF THE INVENTION

A circuit is described which is particularly suitable for controlling the display in a video game, or the like. The circuit includes a digital counter for providing signals which indicate the display beam position. The signals in this counter are compared in a comparator means with signals which indicate the desired location of an object on the display. The results of this comparison are coupled to a first memory means which provides output signals to indicate pattern storage locations. These output signals address a second memory means which stores the patterns. The pattern signals are coupled to a transfer means and are employed to control the display beam. In this manner, at least one pattern may be presented at the desired location on the display.

BRIEF DESCRIPTION OF THE DRAWINGS

FIG. 1 is an overall block diagram of the display circuit for the video game, or the like.

DETAILED DESCRIPTION OF THE INVENTION

A digital circuit particularly suitable for use with a video game employing a standard raster scanned, cathode ray tube is described. The invention circuit is employed with a game-programmed microprocessor, game "chip," or the like and its related circuits, hereinafter collectively referred to as the "game's microprocessor." The described circuit primarily interfaces with the game's microprocessor and provides a means for receiving the processed digital information and for converting it to signals which may be employed to control the display beam and the display colors. It will be obvious to one skilled in the art that the particular microprocessor employed in the overall game system, and the particular game which is played are not pertinent to the present invention and that any one of a plurality of commercially available microprocessors or game "chips" may be employed along with known programs.

In the presently preferred embodiment the described circuit is fabricated employing metal-oxide-semiconductor (MOS) technology as a large scale integrated circuit. In particular, n-channel, field-effect devices employing polycrystalline silicon gates are used. However, the circuit may be realized with other fabrication technologies.

In the following description, many specific details such as specific number of bits, specific times, and other details are given to provide a thorough understanding of the invented concepts. It will be apparent to one skilled in the art that these specific details are not required to employ these invented concepts. In other instances in the following description, well-known circuits are shown in block diagram form in order not to obscure the invented concepts in unnecessary detail.

In the following description the word "object" is used as a general term to indicate a pattern without specifying a specific pattern. For example, object No. 1 may be a tree pattern in one instance and a ball pattern in another.

Figure 1:
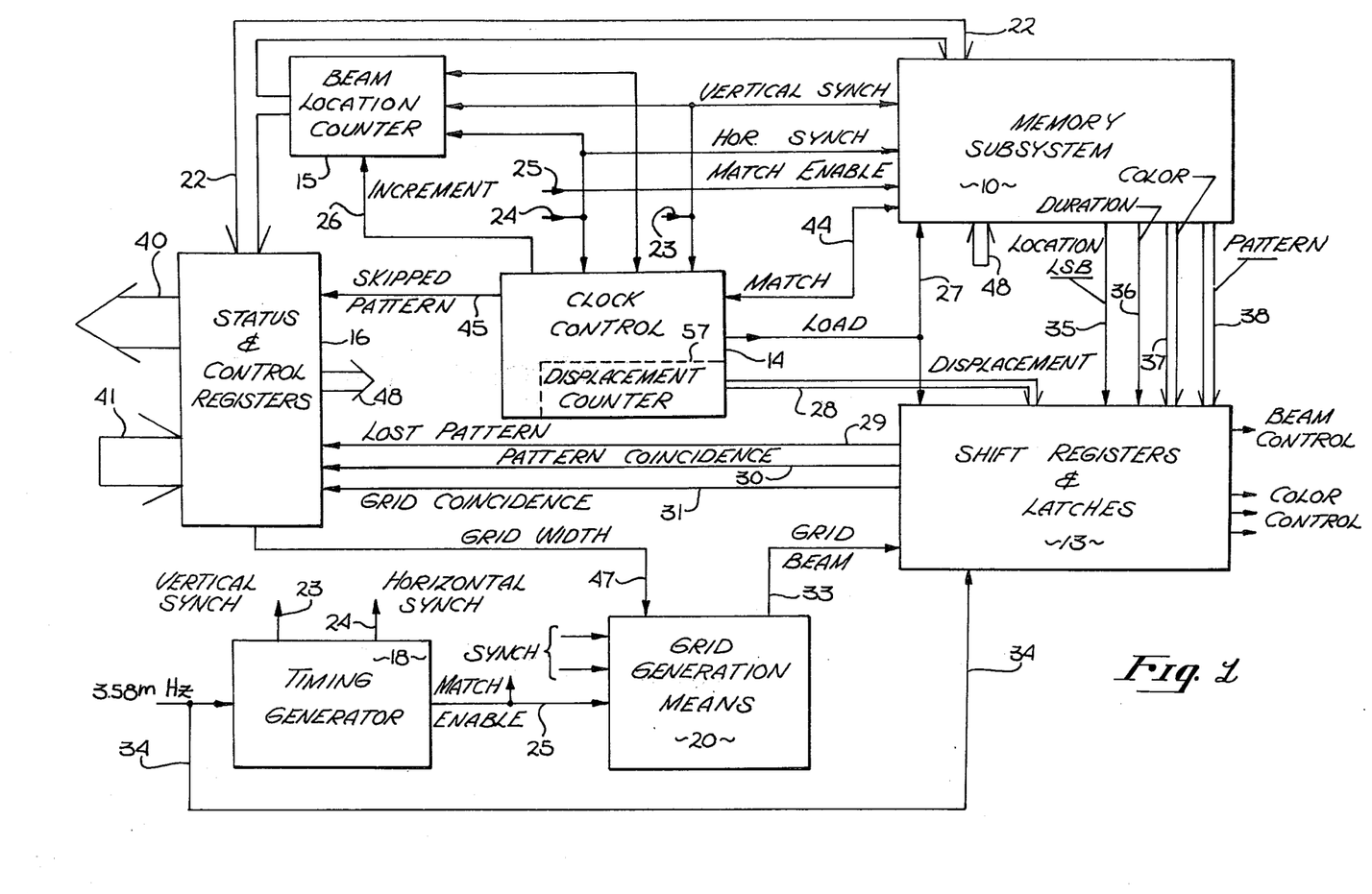

In summary, the circuit of FIG. 1 provides a means for displaying and controlling game patterns on a television screen, or like display. The circuit is coupled to and controlled by the game's microprocessor and communicates with this microprocessor or other circuitry of the game through lines 40 and 41 shown coupled to the status and control registers 16 of FIG. 1. The position of each object which is to be presented on the display is specified by the game's microprocessor and this information is communicated to the memory subsystem 10 on lines 48. Specifically, the position of an object is specified by indicating the location of the upper left-hand corner of the object. (For this purpose, in the presently preferred embodiment the screen is divided into a 256 × 256 point array.) Briefly referring to FIG. 7, by way of example, the location for pattern 119a is specified by point 122; the location of pattern 119b is specified by point 123, and the location of the G pattern is specified by point 130.

Each pattern which is displayed may include a different number of lines or in some implementations it may be desirable to have each pattern include a fixed number of lines.

Figure 7:
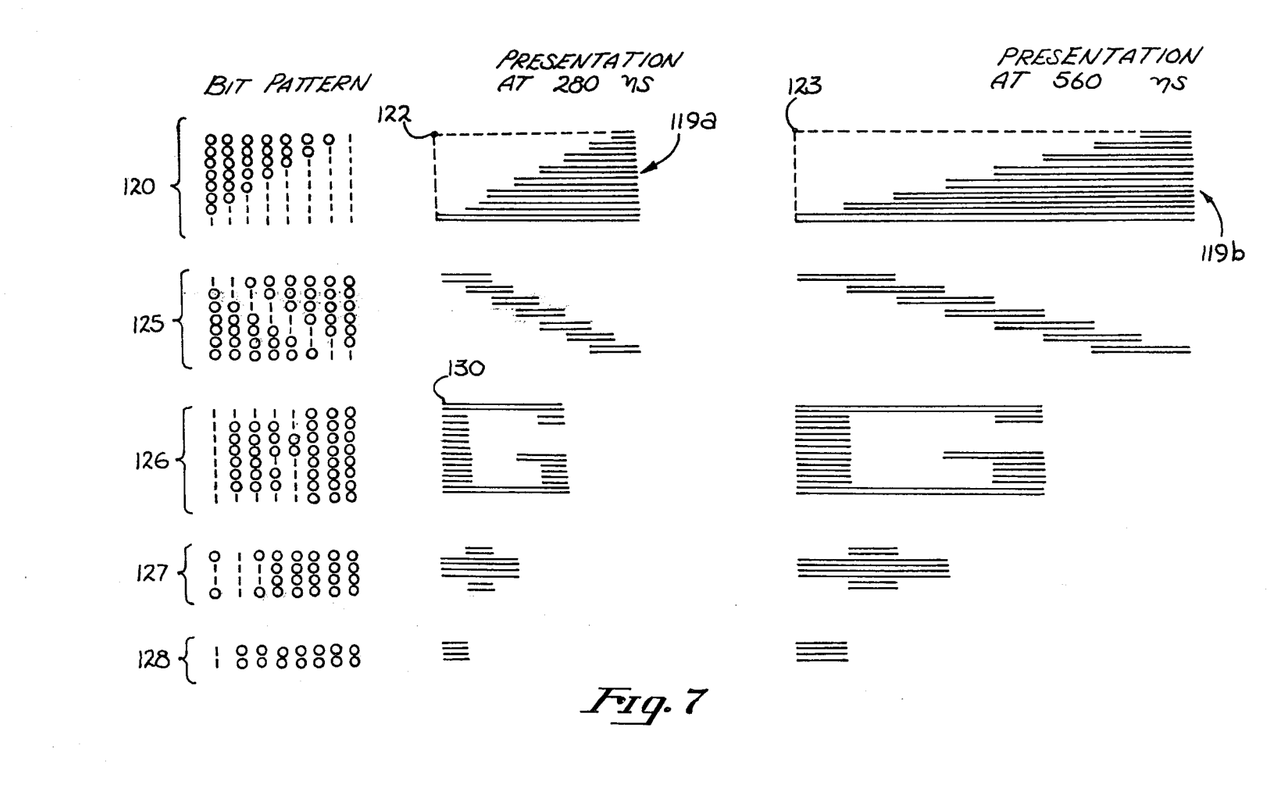
FIG. 7 illustrates several examples of bit patterns and their presentation for two different duration periods.

In the presently preferred embodiment, each line of each pattern consists of eight bits. Again referring to FIG. 7, each line of bit pattern 120 includes eight bits;

the bit pattern 120 includes eight lines. Each bit of the pattern is employed to control the display's beam (on or off control). Also each bit controls the beam for a predetermined duration of either 280 nanoseconds or 560 nanoseconds. This correspond to widths of ⅛ or ¼ inch, respectively, on a 25 inch television screen. Furthermore this corresponds to a width of one or two inches, respectively, for each entire pattern (8 bits). Again referring to FIG. 7, the bit pattern 120 is shown displayed where each bit has a duration of 280 nanoseconds (pattern 119a) and where each bit has a duration of 560 nanoseconds (patterns 119b). Also shown in FIG. 7 are the bit patterns 125, 126, 127, and 128 and the resultant patterns for both 280 nanoseconds and 560 nanosecond durations. Note each line of each bit pattern includes eight bits, however, the number of lines may vary in each bit pattern, for example, bit pattern 128 includes two lines. (Due to interlacing, each line of the pattern actually appears twice on the screen, once for each of the two fields comprising each frame. Thus, 512 lines actually exist on the screen even though bit patterns are provided for only 256 lines. For example, the presentation of bit pattern 128 includes four lines of display with only two lines of bit patterns.)

As mentioned, for purposes of locating objects, the display is divided into a 256 × 256 point matrix. Eight bits are employed to specify the vertical location of each object and eight bits are employed to specify the horizontal location of each object.

As will be explained in greater detail, when the beam reaches the desired position or location of an object, the circuit of FIG. 1 presents the required pattern. The game's microprocessor provides the object-pattern relationship. For example, when the beam reaches point 122 of FIG. 7 the circuit determines which pattern is to be displayed based on the information provided by the game's microprocessor. Then the first line of bit pattern 120 (which is stored within the pattern library) controls the display beam. When the beam subsquently reaches the same horizontal location, the second line of the bit pattern 120 is employed to provide the second line of pattern 119a, and so on.

Figure 2:
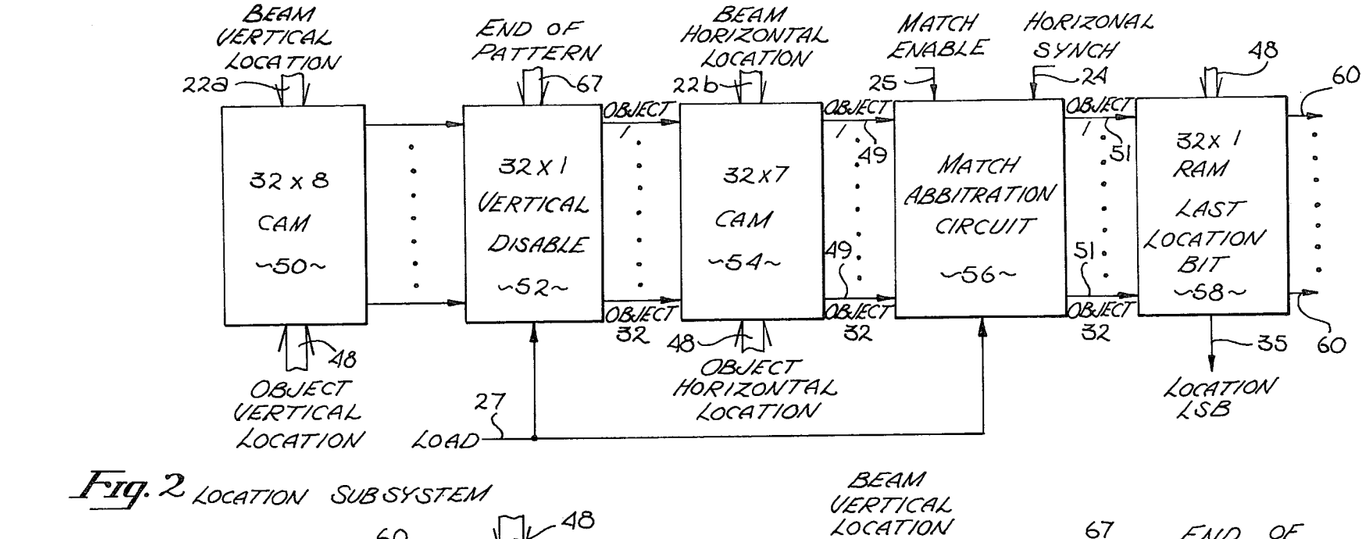
FIG. 2 is a block diagram of the location subsystem employed by the circuit of FIG. 1.
Figure 3:
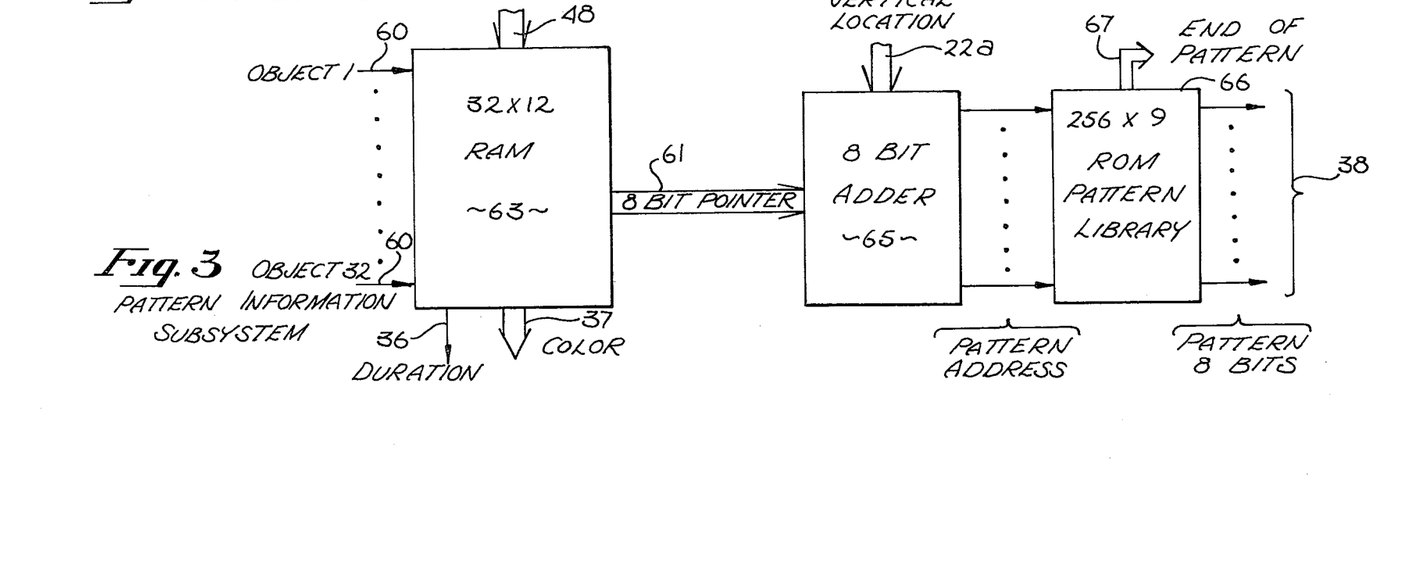
FIG. 3 is a block diagram of the pattern information subsystem of the circuit of FIG. 1.

Referring more specifically to FIG. 1, the circuit includes a memory subsystem 10 which shall be described in detail in conjunction with FIGS. 2 and 3. Generally, this subsystem receives location data and the object-pattern data from the game's microprocessor on lines 48. This data may be applied directly to the memory subsystems or may be passed through the status and control registers 16. This subsystem compares the count in the beam location counter 25 (which is coupled to subsystem 10 by lines 22) with the desired location data and provides bit patterns on lines 38, color bits on lines 37, duration information on line 36, and the last (least) significant bit for the horizontal location on line 35, to the shift register and latches 13.

As will be described in more detail in conjunction with FIGS. 5 and 6, the shift register and latches 13 receive the pattern information including the color, duration and the last significant horizontal bit and provides beam control and color control signals for the display beam.

The circuit of FIG. 1 includes a clock control means 14 which controls the loading of data in subsystem 10 and the shift register and latches 13 in addition to other functions. This loading signal is provided on lead 27. Control means 14 includes a displacement counter 57 which stores a digital number representing the displacement between the actual beam location and the location indicated by the count in the beam location counter 15. The count in counter 57 is coupled to register and latches 13 by lines 28 as will be described in conjunction with FIG. 5. Control means 14 provides a signal to increment counter 15 on line 26 and a signal on line 45 to registers 16 to indicate that a pattern has been skipped. The clock control means 14 may be fabricated from ordinary, well-known circuits; the logic associated with these circuits will be described in conjunction with FIG. 4.

The beam location counter 15 may be an ordinary 15 bit digital counter employed for providing digital signals representative of the vertical and horizontal location of the display beam. Eight bits are employed for vertical location and seven for horizontal location. The last bit (least significant) required for the horizontal location is supplied through a separate path as shown in FIG. 5. Thus the beam location counter and CAM 54 resolve the horizontal location to one of 128 pairs of locations. This permits the location subsystem of FIG. 2 to operate at half speed. As will be seen, the exact location (one of 256 points) is resolved in the transfer means of FIGS. 5 and 6.

The count in counter 15 does not always represent the actual horizontal location of the beam. In practice the count in counter 15 generally indicates that the beam is ahead of its actual location with this displacement stored in counter 57. When a double match occurs, that is, when two objects are to be displayed at the same location, additional time is obtained to access the pattern library by delaying counter 15. The counter 15 is then incremented at a faster rate when no matches occur.

Eight bits of counter 15 are reset by the vertical synchronization signal (line 23) and the remaining 7 bits are reset by the horizontal synchronization signal (line 24). The digital contents of the counter 15 are coupled to the registers 16 and the subsystem 10 by lines 22.

The timing signals for the circuit of FIG. 1 are provided by the timing generator 18. As shown in FIG. 1, this generator receives an external timing signal of approximately 3.58MHz on line 34 (normal television timing frequency). This signal is also coupled to the shift registers and latches 13. (An internal timing signal may be generated by the circuit, if necessary.) The timing generator provides the vertical synchronization signal on line 23 and the horizontal synchronization signal on line 24. Also the generator 18 provides a match enable signal to the grid generation means 20, beam location counter 15, clock control 14, and memory subsystem 10.

The grid information for the display is generated by the grid generation means 20. The grid width information is received by means 20 on line 47, the grid beam control signal is coupled to the register and latches 13 on line 33. Well-known means may be employed for the grid generation means 20. While this means is not the subject of the present invention the grid beam control signal, line 33, will be described in conjunction with FIG. 6.

The status and control register 16 may be ordinary digital means for providing a buffer with the game's microprocessor. (Note that in FIG. 1 numerous logic paths and timing paths well-known in the art which are coupled between status and control registers 16 and other means within the circuit of FIG. 1 have not been shown in order not to overly complicate FIG. 1.) The status and control register 16 receives a signal to indicate the coincidence of two patterns on line 30 and a signal to indicate the coincidence of a grid and a pattern on line 31. Registers 16 also receive a signal on line 29 to indicate that a pattern has been lost. The generation of these signals shall be described in conjunction with FIG. 6.

Referring now to FIG. 2 the location subsystem which is a portion of the memory subsystem 10 of FIG. 1 is illustrated. This portion of the memory subsystem 10 compares the count in the beam location counter 15 of FIG. 1 with the desired locations of the objects and when a desired location is reached, provides a signal on one of the lines 60 corresponding to an object number. For the following description it is assumed that 32 objects may be simultaneously displayed, however, any number may be employed.

In the presently preferred embodiment, the comparison of the contents of the beam location counter and the desired locations of the objects is performed with content-addressable memories (CAMs). The eight bits employed for defining the vertical locations for the possible 32 objects are written into CAM 50 by the game's microprocessor as indicated in FIG. 2 by lines 48. The first eight bits of the beam location counter 15 are coupled to CAM 50 on lines 22a. The CAM 50 simultaneously compares the digital signal on lines 22a with the contents of all the possible 32 eight bit words provided on lines 48. When a match occurs a signal is coupled to the vertical disable means 52 on one of the 32 lines 30 coupling CAM 50 with disable means 52. Thus when the desired vertical location of an object is reached the object number is communicated to vertical disable means 52.

Ignoring for a moment the vertical disable means 52, the CAM 54 performs a similar function to the CAM 50. It compares the seven most significant horizontal location bits from the beam location counter (lines 22b) with the desired location of the 32 objects (lines 48). When a desired location is reached the corresponding object number is communicated to circuit 56 on one of the lines 49. CAMs 50 and 54 may be ordinary content-addressable memories fabricated employing known circuits.

When the desired vertical and horizontal locations of an object are reached the first line of the pattern corresponding to that object is displayed, as will be explained. The second line of the pattern must be displayed at the same horizontal location but one line down on the display. In order for this to be accomplished, the comparison of the eight bits of the vertical location by CAM 50 is disabled for that object by vertical disable means 52. Signals are then provided on lines 49 when the horizontal location match is determined by CAM 54. When the pattern has been completely displayed, an end of pattern signal is coupled to the vertical disable means 52 on lines 67 to again allow vertical comparison for that object. Thus, the vertical disable means 52 may be implemented with ordinary logic gates and latches.

It is apparent that a signal may simultaneously occur on more than one of the lines 49. This indicates that lines of more than a one bit pattern must start at the same location. The match arbitration circuit 56 detects multiple matches and sequentially selects one object at a time, and then couples the corresponding signals to lines 51. Thus, if objects 1 and 32 have been selected, the match arbitration circuit 56 will select, by way of example, first, object 1, and then object 32. Predetermined object numbers are given higher priority than others by circuit 56.

The RAM 35 may be an ordinary 32×1 random-access memory. The last location bit which is the least signicant horizontal position bit for each object to be displayed is stored within the RAM 58. This bit is provided by the game's microprocessor on lines 48. When an object is selected, the corresponding last location bit is coupled to line 35.

Figure 4:
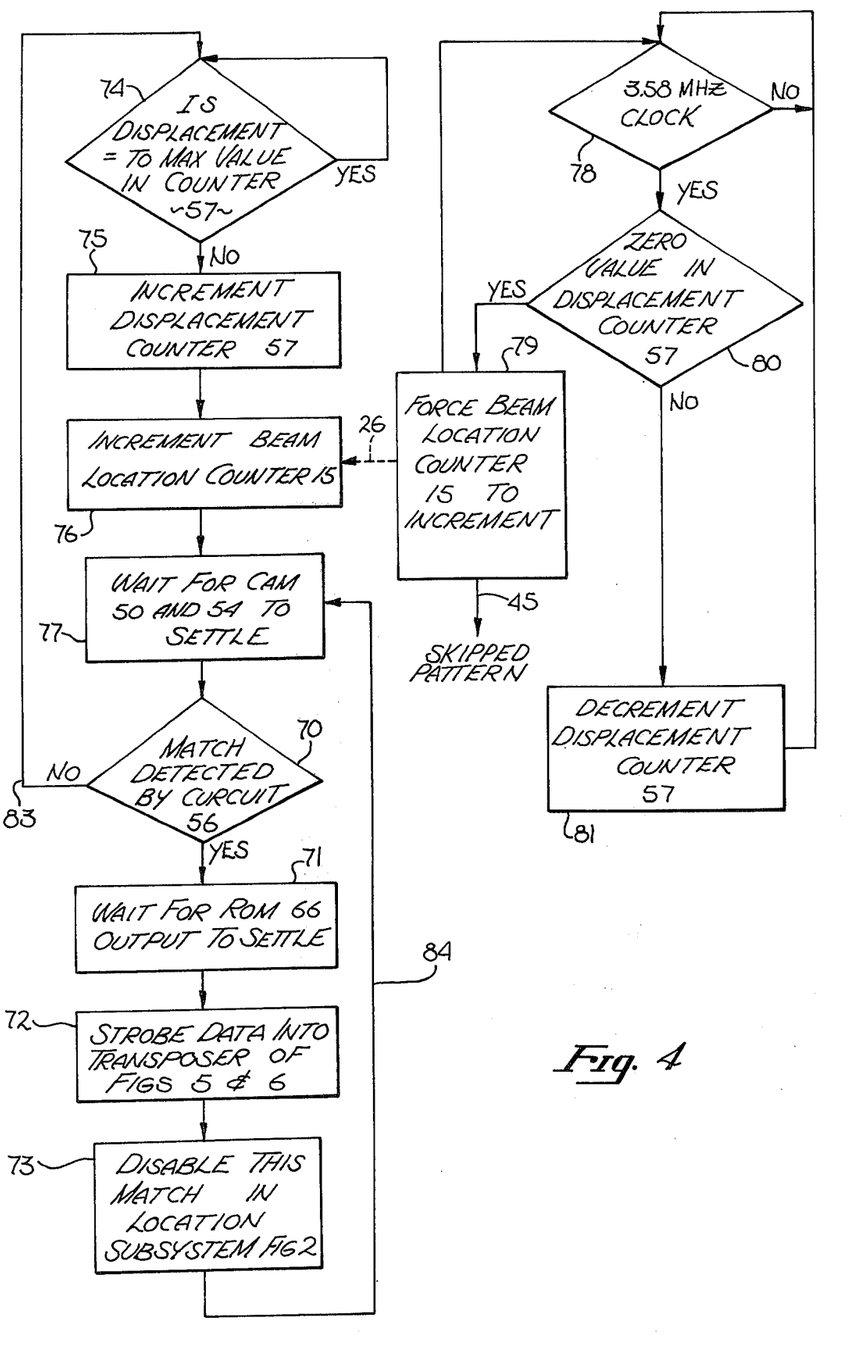
FIG. 4 is a flow chart which illustrates the operation of the clock control means of FIG. 1.

The location subsystem of FIG. 2 receives a load signal on line 27 from a clock control means 14. This signal is coupled to the vertical disable means 52 and the match arbitration circuit 56. The purpose of this signal and the match enable signal applied to line 25 will be apparent when FIG. 4 is described. Resolved arbitrations by the arbitration circuit 56 are cleared during horizontal retrace, thus the horizontal synch signal is applied to circuit 56.

Referring now to FIG. 3, the pattern information subsystem is a portion of the memory subsystem of FIG. 1. RAM 63 which is coupled to the 32 lines 60, stores the object-pattern relationship, and the duration and color information. This 32×12 memory couples a twelve bit word to its output for each of the possible 32 objects. Eight bits of each output word are coupled to lines 61, three bits to line 37, and one bit to line 36. The information stored within RAM 63 is generated by the game's microprocessor and coupled to this memory by lines 48. This memory correlates an object number with a specific pattern. For example, if object No. 1 has been selected, this memory would identify a pattern such as a tree, ball, or the like by indicating the pattern's location in the pattern library. Also this memory uses three bits to define the color for the pattern (lines 37). The remaining bit determines the duration for each of the pattern bits, that is, whether they will be displayed for 280 nanoseconds or 560 nanoseconds as shown in FIG. 7.

The eight bits of information on lines 61 (pattern pointer) specifies the address of the first word of the pattern, for example, the first line of bit pattern 120 of FIG. 7. However, this pattern pointer does not directly address the pattern library 66, but rather indirectly specifies the location as a displacement from the vertical location of the beam. The reason for this, as will be seen, is that successive lines of the pattern may then more easily be addressed. The eight bit pattern pointer (lines 61) are added within an eight bit adder 65 to the eight bits representing the vertical beam location (lines 22a) received from the beam location counter 15 of FIG. 1. The output of adder 65 is employed to address the pattern library 66.

In the presently preferred embodiment the pattern library 66 comprises a 256×9 read-only memory (ROM). Each pattern address selects a nine bit word. Eight bits of this word define a line of the pattern and are coupled to lines 38. The last bit is used to indicate the end of the selected pattern, that is, this bit will be a binary-one for the last line of the pattern. This information is employed to generate an end of pattern signal for the vertical disable means 52 of FIG. 2.

Assume for purposes of explanation that the letter "G" defined by bit pattern 126 of FIG. 7 is to be displayed with the upper left-hand corner of this letter (point 130) located on the screen at line 70, in a horizontal location of 80. Further assume that this letter has been designated as object No. 1 by the microprocessor.

The desired vertical and horizontal locations are communicated to the CAMs 50 and 54, respectively on lines 48. In the case of the horizontal location the last significant bit of this location is provided to the RAM 58. When the beam location counter indicates that the beam is at line 70, a signal is communicated from the CAM 50 to the vertical disable means and to the CAM 54. When the horizontal position of the beam (as defined by the seven most significant bits) reaches the horizontal position 80, a signal is provided on one of the lines 49 to the match arbitration circuit 56 to indicate that object No. 1 has been selected. (Assume for purposes of discussion that only a single match occurs, that is, no other pattern lines are to begin at point 130.) A signal is then applied to the RAM 58 on one of the lines 51 to indicate that the location of object No. 1 has been reached. The least significant bit of the horizontal location for object No. 1 is communicated to line 35. The signal for object No. 1 is also coupled on one of the lines 60 to the RAM 63. (Assume that the eight lines in the bit pattern 126 of FIG. 7 are stored within the pattern library in lines 110 through 117.) The RAM 63 specifies the "G" pattern with the eight bit pointer as a displacement from the vertical location of the beam. Thus the eight bit pointer would indicate the number 40. This number is added to the vertical beam location (70) within the adder 65 and the resultant number 110 addresses the pattern library to select line 110. The binary word 11111000 is then coupled to lines 38 which allows the first line of the letter "G" as shown in FIG. 7 to be displayed. The game's microprocessor also provides RAM 63 with the duration and color information for this pattern.

Continuing with the above example, because of the vertical disable means 52, the vertical beam position is no longer compared with the desired vertical location. Thus, when the beam next reaches the horizontal location corresponding to 80, a signal is again applied through circuit 56, and RAMs 58 and 63 to the adder 65. This signal remains the same, that is, the number 40. This number is now added in adder 65 with the current vertical beam location which is now line 71. The results of this summation (111) selects the second line of the bit pattern 126 (FIG. 7). In a similar fashion, each line of the pattern is coupled to the lines 38. When the end of the pattern is reached a signal is coupled to the vertical disable means 52. If a second match is detected by circuit 56, the pattern library is sequentially addressed; for example, the second line of one pattern could first be read from the ROM and then the fourth line of another pattern read from the ROM. The manner in which these matches and overlap patterns are processed will be described in more detail, particular in conjunction with FIGS. 4 and 6.

One advantage to the pattern library as described is that a stored bit pattern may be employed to provide more than a single pattern. Any portion of a pattern may be used to provide a separate pattern provided it is the final portion of the pattern. The final portion must be used in order to obtain the end of pattern signal required by the vertical disable means 52 of FIG. 2. For example, if a diamond shaped pattern is stored in the pattern library, the lower half of this pattern may easily be displayed by first addressing the middle line of this pattern.

If two or more objects are specified at the same location it is necessary to read all the bit patterns from the pattern library before the beam location counter is incremented. For the presently preferred embodiment, the time required to read out two patterns will exceed 280 nanoseconds. It should be noted that two objects may appear to be at same locations, when in fact they are not. This occurs since only seven horizontal bits are used by the CAM 54; the eighth bit is ignored for purposes of this comparison.

The horizontal count (last seven bits) in the beam location counter 15 ideally remains higher than the actual horizontal beam location. When the count in the displacement counter 57 is maximum, the beam trails the count in counter 15 by the predetermined maximum count which for the described embodiment is a count of three. When two or more patterns are to be displayed at the same location, the count in counter 15 is delayed thus the beam begins to approach the count in counter 15. If the beam reaches the count in counter 15, the beam location counter must be incremented even if this means that patterns will not be displayed. In this case, a signal is communicated to registers 16 on line 45 to indicate that a pattern has been skipped.

The operation of the clock control means 14 and its displacement counter 57 along with the beam counter 15 may be best understood from the flow diagram of FIG. 4. It will be apparent to one skilled in the art that this flow diagram may be implemented with well-known logic circuitry.

Referring first to block 70, two possible conditions can occur; either circuit 56 of FIG. 2 determines that a match has occurred or no match occurs. If a match occurs, as indicated by blocks 71 and 72, a line of a bit pattern from the pattern library 66 is read into the registers of FIGS. 5 and 6. Then as indicated by block 73, the match is disabled within the location subsystem of FIG. 2 and the next object number may be determined from the CAMs 50 and 54 as indicated by the line 84 and block 77. If another match is present for the same beam location count, the path comprising blocks 70, 71, 72, 73, line 84 and block 77 is repeated.

While this is occurring as shown by block 78, the 3.58Mhz clock causes the count in the displacement counter 57 to be evaluated as indicated by block 80. If the count in this counter is not zero, then this counter is decremented as indicated by block 81. These decrements indicate that the beam is approaching the count in the beam counter. If a value of zero is reached in the displacement counter, the beam location counter 15 must be incremented as indicated by block 79 and line 26. This means the beam has reached the count in counter 15, and thus, counter 15 must be incremented. When this occurs a pattern will be skipped and a corresponding signal is communicated on line 45 to register 16 of FIG. 1.

If no match is detected by circuit 56, the contents of the displacement counter are examined for the maximum displacement as indicated by line 83 and block 74. If the count is not the maximum value, the displacement counter is incremented and the beam location counter is incremented as indicated by blocks 75 and 76. If the displacement is less than the maximum value and there are no matches the incrementing of the beam location counter will proceed at a higher rate until the maximum count is reached (blocks 74, 75, 76, 77, 70 and line 83). Once the count in the displacement counter 57 is equal to its maximum value, the beam location counter is incremented at a rate equivalent to the movement of the beam across the display.

Figure 5:
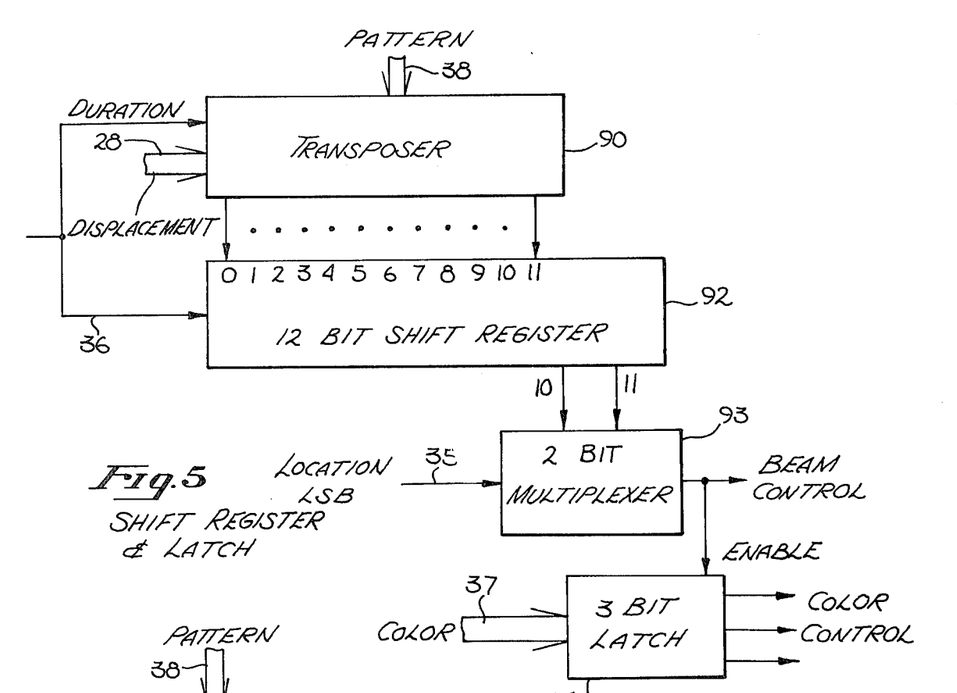
FIG. 5 is the block diagram of a shift register and latch employed for providing a beam control signal and color control signals.

Referring now to FIG. 5, the eight pattern bits of each pattern line are coupled into transposer 90. This transposer is coupled to a twelve bit shift register 92. The 10th and 11th bits of the shift register 92 are coupled to a two bit multiplexer 93. The selection of these bits is controlled by the last significant bit signal which is coupled to the multiplexer on line 35. The output of the multiplexer 93 provides the beam control signal. This signal also enables a three bit latch 94 which receives the color control signals on lines 37. The output of this latch provides the color control signals for the display.

Transposer 90 transposes the eight pattern bits to the left, as a function of the count in the displacement counter. This displacement is provided to the transposer 90 on the lines 28.

Assume that the displacement counter 57 has a count of three (the maximum value in the preferred embodiment), then the bit patterns are loaded into stages 0 through 7 of register 92 if the duration for these bits is designated as 280 nanoseconds. The displacement of three indicates that the beam is three counts behind the count in the location counter, and thus when the pattern is shifted in register 92, it will control the beam three counts later, thus compensating for the displacement. In a similar manner, for durations of 280 nanoseconds and a displacement count of two, the bits are loaded into stages 1 through 8, and so on. For a duration of 560 nanoseconds and a displacement count of three or two, the bits are loaded into stages 2 through 9; and, for a displacement count of one or zero and a duration of 560 nanoseconds, the pattern bits are loaded into stages 3 through 10 of register 92. The rate at which the pattern bits are shifted in the shift register 92, register 92 is controlled by the duration signal on line 36, thus in this manner each bit may be employed to provide either a 280 or 560 nanosecond control signal for the beam.

The two bit multiplexer senses the bits in stages 10 and 11 of register 92. Register 92 is implemented to shift on the leading edge of the clock signal. If the last significant bit (line 35) is a binary zero, then the first bit of the pattern will be presented at once and the shifting will take place one clock cycle later. However, if the last significant bit is a one, then the first bit is not presented until half a clock cycle later. In this manner, the last significant bit is employed to determine the starting point for each line of the pattern.

It is apparent from FIG. 3 that in some instances a line of bit pattern may be in register 92 (or in the process of being shifted along this register) when another line for another pattern is being brought out on lines 38. To accommodate for more than a single line of bit pattern, a plurality of shift registers 92 are required. As shown in FIG. 6 shift register and latches 100, 101 and 102 are coupled to the transposer 90. Each shift register and latch 100 comprises a shift register 92, a two bit multiplexer 93, and a three bit latch 94 as shown in FIG. 5. The beam control signal from means 100, line 114 is coupled to one input terminal of an OR gate 106. Similarly, the beam control lines 115 and 116 from shift register and latches 101 and 102, respectively, are coupled to the other input terminals of the OR gate 106. The color control signals from the shift register and latches 100, 101 and 102; lines 111, 112, and 113, respectively, are coupled to a color resolver 103. This means resolves conflicting color signals in accordance with predetermined priorities and provides single color control signals.

The output of the OR gate 106 is coupled to one input terminal of an OR gate 107. The other input terminal of the OR gate 107 receives the grid beam control signal on line 33. The output of the OR gate 107 provides the beam control signal. The three input lines to the OR gate 106, lines 114, 115 and 116, are also coupled to a coincidence detector 109. This detector, which may be an ordinary logic means, determines when a signal is present on more than a single line and thus provides a pattern coincidence signal on line 30. The grid beam signal is also coupled to the coincidence detector 109. The detector 109 determines when a signal is present on line 33, and concurrently on either of the lines 114, 115 and 116, thus providing a grid coincidence signal on line 31.

Each time the transposer 90 receives a pattern from the pattern library on lines 38, and after it provides the correct transposing as determined by the duration signal and displacement count, it loads the pattern into an empty register. If there are no empty registers, then a lost pattern signal is provided (line 29 of FIG. 1).

Figure 6:
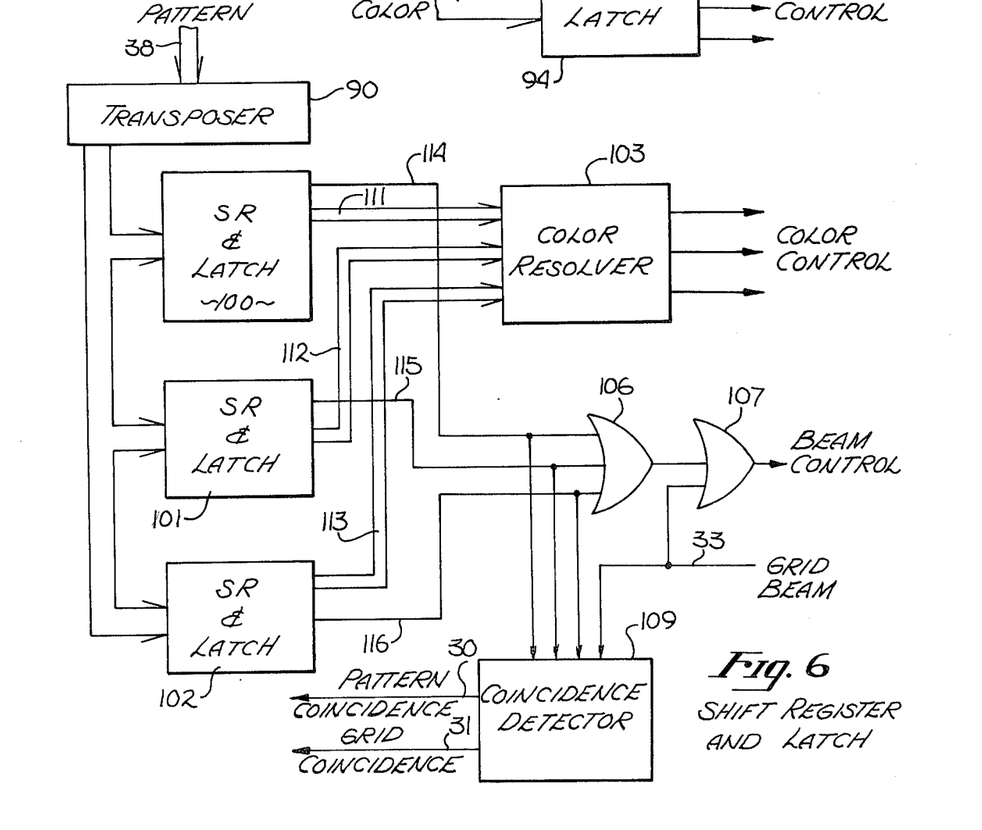
FIG. 6 is a block diagram illustrating the manner in which a plurality of shift registers, such as that shown in FIG. 5, are coupled to provide a single beam control signal and resolved color control signals.

As is apparent from FIG. 6, the coincidence of patterns and the coincidence of the grid and patterns is easily detected with ordinary logic gates. This is an important feature of the described circuit since coincidence detection plays an important role in many games. Coincidence detection has been difficult with most prior art display circuits.

Thus, a display circuit has been described which is particularly suitable for use with a video game. The circuit provides numerous advantages including easy determination of coincidence of patterns and patterns with the grid, circuit means for handling overlapping patterns, a versatile pattern library, in addition to other features.

I claim:
1. A circuit for controlling the display of patterns comprising:
   a digital counter for providing a first digital signal representative of display beam location;
   comparator means for comparing said first digital signal with a second digital signal representative of the desired location of an object on said display, said comparator means coupled to said digital counter;
   first memory means for storing digital information and for providing output signals representative of pattern storage locations, said first memory means coupled to said comparator means;
   combining means for combining two digital signals, said combining means receiving said output signals from said first memory means and a digital signal representative of vertical beam location;
   second memory means for storing digital representations of patterns, said second memory means coupled to receive output signals from said combining means; and
   transfer means for receiving said digital representations of patterns from said second memory means and for providing a beam control signal for said display beam, said transfer means coupled to said second memory means;
   whereby at least one pattern may be placed at said desired location on said display.

2. The circuit defined by claim 1 wherein said comparator means comprises at least one content-addressable memory.

3. The circuit defined by claim 2 wherein said first memory means comprises a random-access memory.

4. The circuit defined by claim 3 wherein said second memory means comprises a read-only memory.

5. The circuit defined by claim 4 wherein said read-only memory in addition to storing said digital representations of patterns, also stores a signal to indicate the end of a pattern.

6. The circuit defined by claim 1 wherein said first memory means provides output signals for controlling display color.

7. The circuit defined by claim 6 wherein said first memory means provides output signals for controlling said display beam duration.

8. The circuit defined by claim 1 wherein said first memory means also provides a horizontal location signal for said display beam.

9. A circuit for controlling the display in a video game, or the like, comprising:
 a digital counter for providing digital signals respresentative of display beam position;
 location means for positioning objects on said display, said location means coupled to said digital counter;
 pattern storage means for storing signals representative of said patterns, said pattern storage means coupled to said location means;
 a displacement counter for providing a signal representative of the difference between the actual horizontal beam position and the count provided by said digital counter, said displacement counter coupled to said digital counter;
 control means for delaying counting in said digital counter and for causing said displacement counter to count, so as to provide time to read said digital signals representative of said patterns from said pattern storage means, said control means coupled to said displacement counter;
 transfer means for receiving said digital signals representative of said patterns from said pattern storage means and for providing a beam control signal for said display;
 whereby patterns may be displayed at said desired position.

10. The circuit defined by claim 9 wherein the count in said displacement counter is coupled to said transfer means for controlling the time at which said signals representative of said patterns are provided for said beam control.

11. The circuit defined by claim 9 wherein said transfer means includes a plurality of shift registers.

12. The circuit defined by claim 11 including means for controlling the rate at which said digital signals representative of patterns are shifted in said shift registers.

13. The circuit defined by claim 12 wherein said location means includes content-addressable memories.

14. The circuit defined by claim 9 wherein said transfer means receives a signal from said location means representing a portion of the desired horizontal location of objects, said transfer means employing said signal for controlling the time at which said beam control signal is provided.

15. The circuit defined by claim 9 wherein said transfer means includes a plurality of shift registers and wherein a coincidence detection means for detecting the coincidence of signals is coupled to the outputs of said shift registers to provide a signal for the coincidence of patterns.

* * * * *